United States Patent
Kinzbach

[15] 3,662,867
[45] May 16, 1972

[54] FORCE TRANSMITTING COUPLING

[72] Inventor: Robert B. Kinzbach, 6203 Valley Forge, Houston, Tex. 77027

[22] Filed: Mar. 13, 1970

[21] Appl. No.: 19,249

[52] U.S. Cl.................................192/45, 81/59.1, 81/91 B, 188/67, 285/81
[51] Int. Cl...................................F16d 15/00, F16d 41/06
[58] Field of Search........................192/41S, 44, 45, 45.1; 188/82.8, 82.84; 81/57.2, 59.1, 91 B

[56] References Cited

UNITED STATES PATENTS

| | | | |
|---|---|---|---|
| 2,082,842 | 6/1937 | Marland | 192/45 |
| 3,221,850 | 12/1965 | Bacon | 192/45 |
| 2,843,238 | 7/1958 | Rozner | 192/45 |
| 76,328 | 4/1868 | Johnson et al. | 192/45 |
| 1,512,675 | 10/1924 | Chryst | 192/45 |
| 3,061,060 | 10/1962 | Stephenson | 192/45.1 X |
| 2,365,062 | 12/1944 | Dodge | 192/45.1 |
| 1,718,074 | 6/1929 | Reece et al. | 188/82.84 X |
| 1,593,000 | 7/1926 | Wilson | 81/91 B X |
| 2,557,202 | 6/1951 | Raymond et al. | 81/91 B UX |
| 2,576,203 | 11/1951 | Wilson | 81/57.2 X |

Primary Examiner—Allan D. Herrmann
Attorney—Ralph R. Browning and C. James Bushman

[57] ABSTRACT

A coupling for use with two relatively movable members to transmit force between said members comprising a resilient element having a plurality of convolutions positioned between the members and a solid core element positioned within the convolutions of said resilient element, said resilient element being positioned such that the relative movement of said members urges said convolutions into frictional engagement with both of said members. The solid core element is of a size such that when frictional engagement of said members with said convolutions occurs, the convolutions are prevented from being distorted beyond their elastic limit to thereby cause permanent set of the resilient element.

10 Claims, 14 Drawing Figures

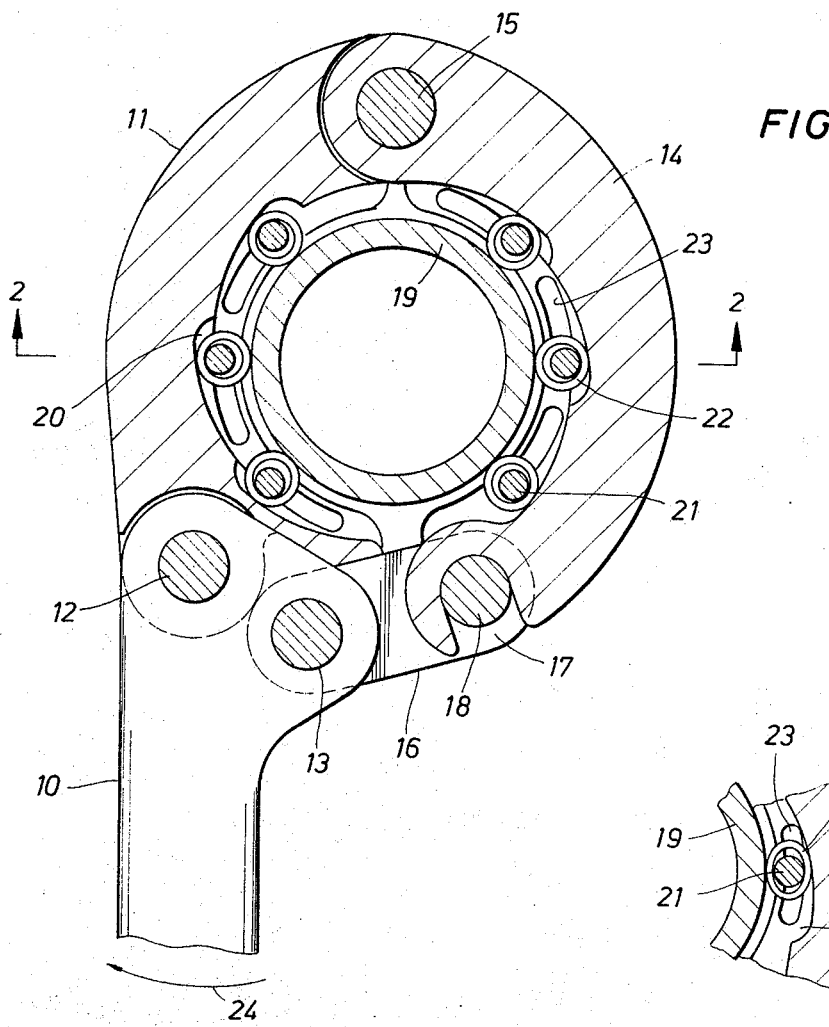
FIG. 1
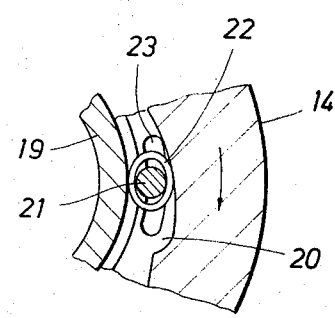
FIG. 3
FIG. 2
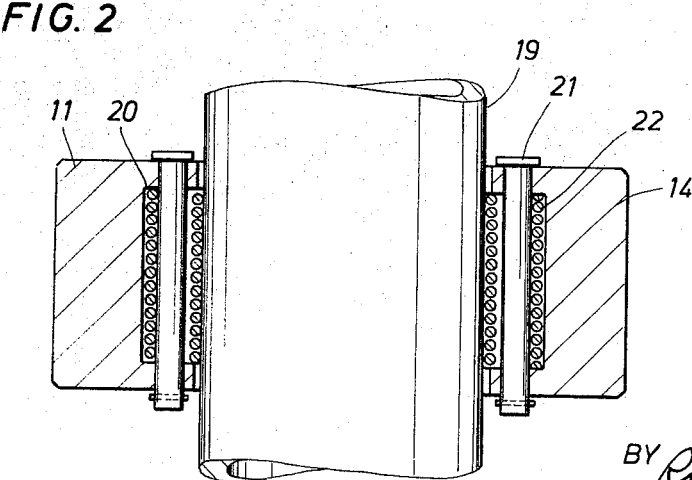
Robert B. Kinzbach
INVENTOR
BY Ralph R. Browning
ATTORNEY

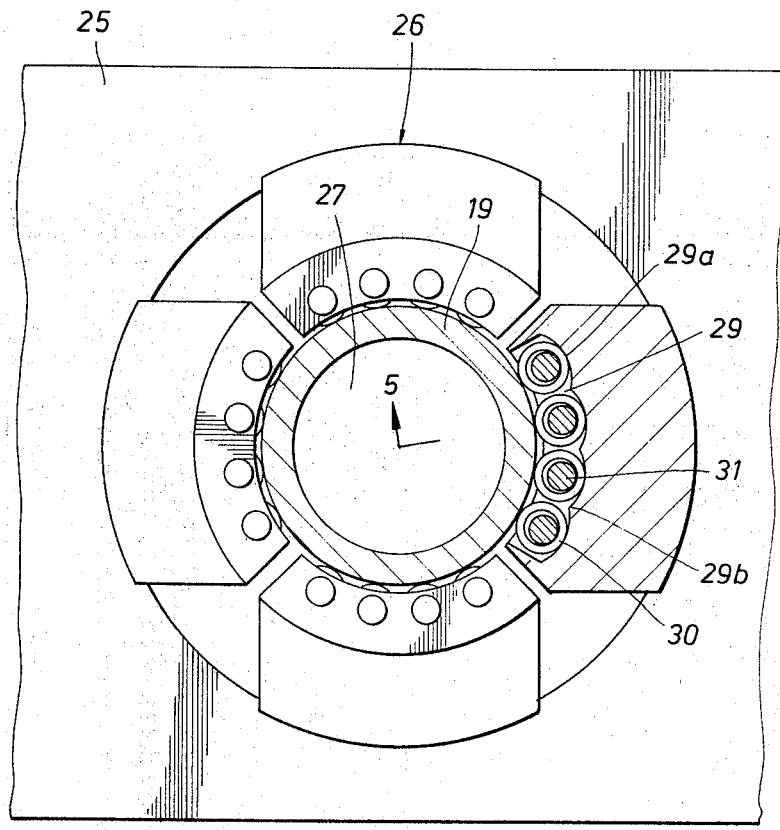
FIG. 4
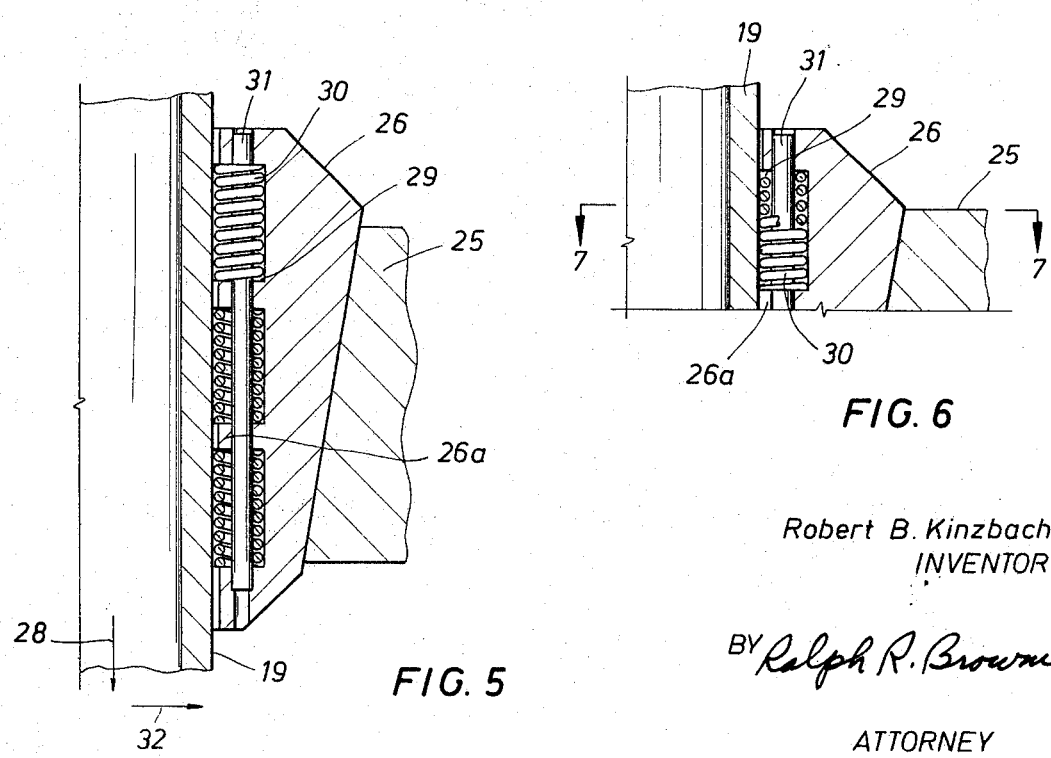
FIG. 5
FIG. 6
Robert B. Kinzbach
INVENTOR
BY Ralph R. Browning
ATTORNEY

PATENTED MAY 16 1972

Robert B. Kinzbach
INVENTOR

BY Ralph R. Browning
ATTORNEY

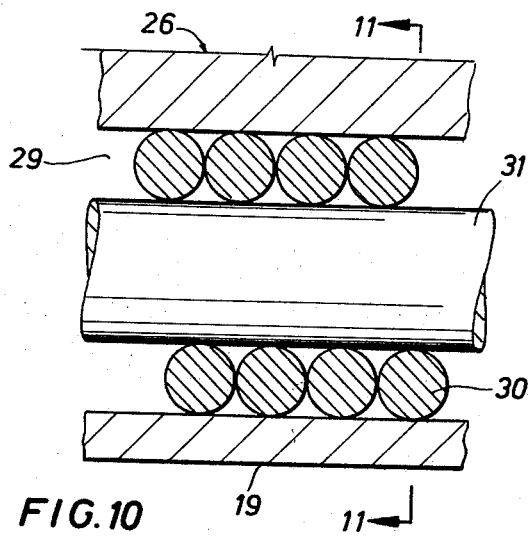
FIG. 10
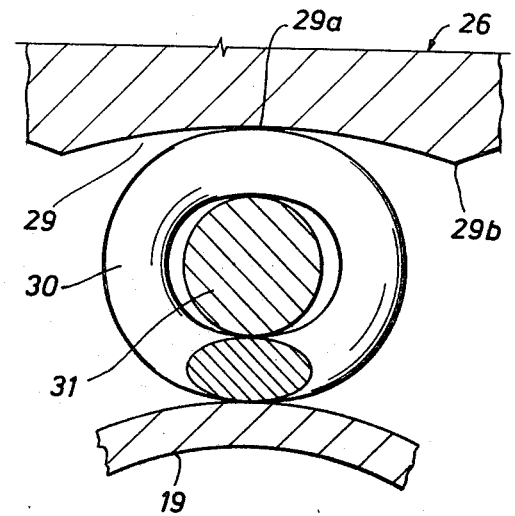
FIG. 11
FIG. 13
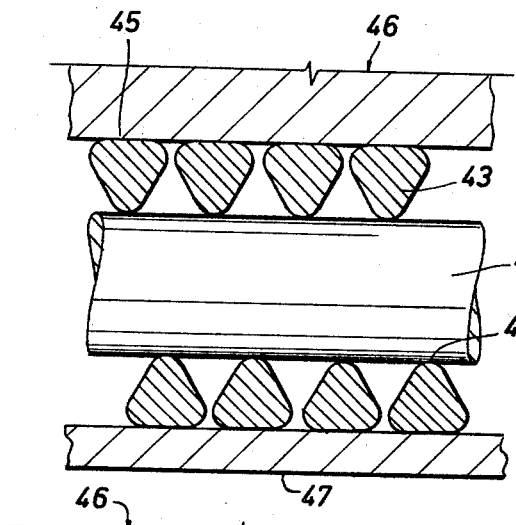
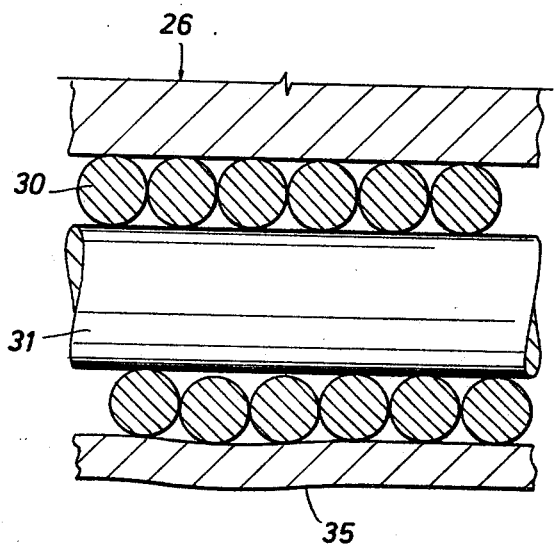
FIG. 12
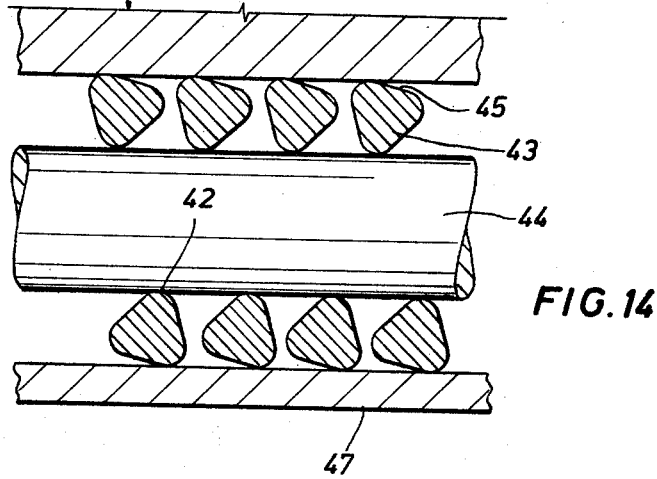
FIG. 14
Robert B. Kinzbach
INVENTOR
BY Ralph R. Browning
ATTORNEY

FORCE TRANSMITTING COUPLING

BACKGROUND OF THE INVENTION

The present invention relates to a coupling for transmitting force between two relatively movable members. More particularly, the present invention relates to a frictional force transmitting means for use in combination with two relatively movable members.

Most friction energized devices used in the handling of pipes, bars, rods, etc., employ toothed penetrators as grip elements. The grip elements are laterally loaded by means of wedges, cams, linkages or other such force systems to force the penetrators into gripping engagement with the pipe, rod, etc. While such devices are generally successful in terms of their ability to grip, they suffer from disadvantages which in certain cases can be quite serious. For example, the use of such gripping devices in oil field operations wherein the gripping devices are in the form of pipe tongs, pipe slips, etc., present a problem in that often the toothed gripping element will dig into the casing, drill pipe, tubing, etc., forming sharp edged notches. Particularly when handling drill pipe or tubing, the use of such devices may result in the drill pipe failing while under load due to the sharp edged stress raising cuts in the pipe wall caused by the toothed gripping devices. Moreover, most commonly used friction gripping devices or couplings are not readily adaptable to irregularly shaped surfaces due to the fact that the rigid tooth penetrators are not able to uniformly engage the undulating surface of the member sought to be gripped.

SUMMARY OF THE INVENTION

It is therefore an object of the present invention to provide, in combination with two relatively movable members, a device for transmitting force between said members.

It is a further object of the present invention to provide a frictional gripping device possessing controlled limit elasticity which allows substantially uniform contact adjustment to irregular surfaces.

Still another object of the present invention is to provide a gripping device having a fixed dimensional range of elastic contact followed by solid gripping engagement.

Yet another object of the present invention is to provide a gripping device which minimizes the surface damage to members gripped therewith.

Another object of the present invention is to provide an improved gripping device for use in pipe tongs, pipe slips, clamps, etc.

Still another object of the present invention is to provide a safety joint or coupling for use in pipe strings.

These and other objects which will become apparent from the figures, the description given herein and the appended claims are accomplished by the novel force transmitting coupling of the present invention.

In its broader aspects, the present invention provides in combination with two relatively movable members, a coupling for transmitting force or motion between the members comprising a resilient element having convolutions, preferably circular, positioned between the two relatively movable members and a solid core element positioned within the convolutions of the resilient element. The convolutions of the resilient element are positioned adjacent the two relatively movable members such that sufficient relative movement of said members urges the convolutions into frictional engagement with both of the members. The solid core element, disposed within the convolutions, is of a size such that the convolutions are prevented from being distorted beyond their elastic limit resulting in permanent set of the resilient element.

BRIEF DESCRIPTION OF THE DRAWINGS

FIG. 1 is a view, partially in section, showing the gripping device of the present invention in use in a pipe tong.

FIG. 2 is a cross-sectional view taken along the line 2—2 of FIG. 1.

FIG. 3 is a partial view of the pipe tong of FIG. 1 in the gripping state.

FIG. 4 is a view partially in section of the device of the present invention in use in a pipe slip.

FIG. 5 is a cross-sectional view taken along the line 5—5 of FIG. 4.

FIG. 6 is a partial view of the pipe slip of FIG. 4 in the gripping state.

FIG. 10 is a diagrammatic view showing the general principle of operation of the gripping device of the present invention.

FIG. 11 is a cross-sectional view taken along the line 11—11 of FIG. 10.

FIG. 12 is a diagrammatic view showing the use of the device of the present invention in gripping undulating surfaces.

FIG. 13 is a cross-sectional view similar to FIG. 10 showing a variation in the cross-sectional shape of the resilient element with the element in the relaxed state.

FIG. 14 is a view identical to FIG. 13 except showing the resilient element in the gripping state.

DESCRIPTION OF THE PREFERRED EMBODIMENTS

Figure 7:
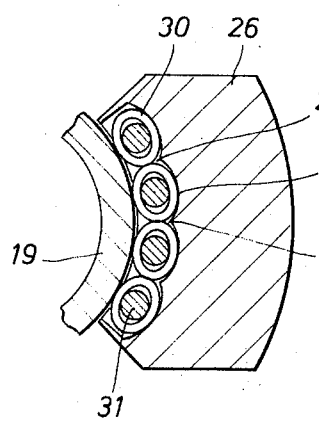
FIG. 7 is a cross-sectional view taken along the line 7—7 of FIG. 6.

Reference is now made to FIGS. 1, 2 and 3 for a description of the use of the coupling of the present invention in a typical pipe tong. Handle 10 is secured to fixed gripping arm 11 by some suitable fastening means such as bolts 12 and 13. Movable gripping arm 14 is pivotally connected on one end to fixed arm 11 by means of pivot pin 15. Fixed arm 11 and movable arm 14 are arcuate in shape having a substantially circular radius of curvature. Locking arm 16 is pivotally mounted to handle 10 and fixed gripping arm 11 by means of bolt 13 which extends through handle 10, fixed gripping arm 11 and locking arm 16. Movable gripping arm 14 has a slot 17 closely adjacent the end opposite the pivotally attached end. Locking arm 16 has a locking pin 18 fixedly attached thereto and positioned such that when pipe 19 is placed in the pipe tong, and movable locking arm 14 is pivoted to partial encirclement thereof, locking arm 16 can be pivoted such that locking pin 18 engages slot 17 to thereby completely encircle pipe 19. As can be seen, when pipe 19 is held within the pipe tong, it is generally annularly spaced from fixed locking arm 11, movable locking arm 14 and locking arm 16. Fixed locking arm 11 and movable locking arm 14 have a series of arcuate-shaped recesses 20 usually regularly spaced on each of said arms so as to give a scalloped appearance. While not necessary, the recesses 20 are so spaced so as to be evenly distributed on opposing semi-circular sides of pipe 19. Arcuate recesses 20, which face pipe 19, are disposed in arms 11 and 14 such that the distances between the outside surface of pipe 19 and the bottom of recesses 20 increase as one moves circumferentially around the pipe from the shallowest part of the recesses to the deepest part of the recesses. A series of solid core elements 21 having coiled therearound coil springs 22 are slidably mounted in arcuate recesses 20. Solid core elements 21 extend through arcuate-shaped slots 23 located above and below arcuate recesses 20 thereby allowing springs 22 and core elements 21 to move in a fixed limit path around the circumference of pipe 19. As seen, the long axes of solid core elements 21 are disposed in parallel fashion to the long axis of pipe 19, the axes of springs 22 being accordingly parallel to the long axis of pipe 19.

When the convolutions of springs 22 are in the deepest part of arcuate recesses 20, the convolutions of springs 22 are substantially undistorted and springs 22 are in a relaxed state. As will be noted, in this case, the convolutions of springs 22 while closely adjacent the outer surface of pipe 19 are not frictionally engaged therewith. To frictionally engage the pipe tong with pipe 19, handle 10 is moved in the direction indicated by the arrow 24. This movement results in springs 22 and solid core elements 21 being rolled under frictional contact with pipe 19 toward the shallower part of arcuate recesses 20 thus causing the convolutions of springs 22 to be wedged between the outer surface of pipe 19 and the walls of fixed and movable gripping arms 11 and 14 resulting in a transverse compression of the convolutions. While the convolutions of springs 22 will be distorted from a generally circular to a more elliptical shape by the above described action, as is clearly seen in FIG. 3, the presence of solid core elements 21 prevents the convolutions from being distorted such that a permanent set in springs 22 occurs.

The use of the coupling device in the tongs described above, allows a fixed dimensional range of elastic contact with the pipe followed by solid engagement between the tongs and the pipe. Furthermore, the use of the coil springs wherein the convolutions have a circular cross-section when viewed in a plane perpendicular to the long axis of the spring and when the convolutions themselves are circular allows the member, i.e. the pipe, to be frictionally engaged by multiple contoured gripping surfaces instead of the sharp edged points or teeth of solid toothed elements commonly used. As can readily be appreciated, since it is the rounded surfaces of the springs which are engaging the pipe, stress raising notches which so often result in pipes by the use of prior art pipe tongs are contoured for reduced stress levels. It will be understood that the general construction of the pipe tong set forth above is illustrative only. For example, recesses 20 need not be arcuate but can be straight and inclined so as to provide a substantially wedged shaped cavity between the wall of pipe 19 and the wall of the recess. In general, the recesses will have a shape such that they have a varying depth as measured from the pipe surface thus providing a shallower and deeper portion of the recesses. The frictional coupling devices of the present invention can be incorporated into many different types of pipe tongs.

Reference is now made to FIGS. 4, 5, 6 and 7 where a pipe slip incorporating the coupling of the present invention is shown. Pipe slips are most commonly used in oil field operations and serve the primary function of gripping pipes so as to prevent them from slipping into the well bore. A drilling platform 25, which may be a rotary table, having a generally truncated conical bore 27 therethrough serves to encircle the pipe 19. To prevent pipe 19 from slipping downwardly into the well bore, four segmented pipe slips shown generally as 26 are circumferentially disposed in bore 27 between pipe 19 and platform 25. Since pipe slip segments 26 are generally wedge-shaped, any force exerted in the direction shown by arrow 28 in FIG. 5 will force pipe slips 26 into conical bore 27 thereby wedging pipe 19 and preventing its downward motion. Each of pipe slip segments 26 contains a series of cavities 29 spaced so as to lie axially along pipe 19 and facing pipe 19 when pipe slip segments 26 are placed into the conical bore 27. The walls of cavities 29 opposite pipe 19 are scalloped in a series of concave recesses formed by valleys 29a and peaks 29b. Disposed in cavity 29 such that it is adjacent valley 29a is coil spring 30, the axis of which is generally parallel with pipe 19. Through the convolutions of each of springs 30, a solid core element 31 is disposed and confined in the cavities 29 of pipe slip segments 26. The diameter of the convolutions of springs 30 is greater than the depth of cavities 29 measured to the lowest point of valley 29a such that the convolutions of springs 30 extend past the face of pipe slip 26 adjacent pipe 19. Thus, when pipe 19 moves in the direction shown by arrow 28, pipe slip 26 will be wedged deeper into bore 27 as seen in FIG. 6 and the convolutions of springs 30 will be compressed in a direction corresponding to arrow 32. Since each of springs 30 in each of cavities 29 is provided with solid abutment means consisting of solid sections 26a of pipe slip segments 26, the axial loading by the movement of pipe 19 in the direction of arrow 28 is distributed more evenly and prevents springs 30 from compressing axially. The movement of pipe 19 as shown by arrow 28 will lead to tight engagement between pipe slip segments 26 and pipe 19. As seen in FIG. 7, the convolutions of springs 30 are distorted to a more elliptical shape by the above described action. Since springs 30 have solid core elements 31 extending through the convolutions thereof, once the convolutions of springs 30 have engaged elements 31 solid contact occurs. Elements 31 will of course be of a size such that the convolutions of springs 30 can not be distorted to a point where the elastic limit of the spring is exceeded. Furthermore, pipe 19 is effectively prevented from rotation in the pipe slips because of the scalloped wall of cavities 29. Any rotation of pipe 19 results in springs 30 being moved toward a peak 29b thus compressing the convolutions transversely and causing tight engagement between pipe 19 and the wall of cavity 29. Since the valleys 29a are circular, rotation in either direction is prevented, i.e. a rolling wedge action occurs in both directions of rotation. The recesses in cavities 29 need not have a circular or other rounded shape but can be V-shaped or any other shape wherein they are deeper in a central region and shallower on the sides.

While pipe slip 26 as shown is a series of individual wedge-shaped segments circumferentially spaced around the opening in the drilling platform 25, it is possible that the pipe slip be of a unitary construction in the shape of a collar for encircling the pipe. Furthermore, when segmented as shown, fewer or more than four segments, depending on design, can be employed. It will be readily apparent, that the use of the force transmitting couplings in the pipe slip described above will prevent the pipe 19 from incurring sharp edged stress producing cuts. The rounded surfaces of the convolutions of springs 30 do not possess the sharp edged surfaces normally encountered in prior art pipe slips. Thus, any cuts which are made in the outside wall of pipe 19 are of a contoured shape thereby eliminating, to a large extent, failure of the pipe when it is put under high and repeated stress in a drilling operation.

As will be recognized from the above descriptions, the use of the force transmitting couplings in the pipe tong and pipe slips described above involves a rolling wedge concept. With reference to the pipe tong and as explained above, when the handle 10 of the pipe tong is moved in the direction corresponding to arrow 24 in FIG. 1, the convolutions of springs 22 will be rolled into the shallower portion of arcuate recesses 23 and be wedged between arms 11 and 14 and pipe 19 in the process. FIGS. 10 and 11 diagrammatically demonstrate this action as applied to a pipe slip. The numbering of FIGS. 10 and 11 corresponds to that utilized in FIGS. 4, 5, 6 and 7. As can be seen from FIG. 11, any attempt to rotate pipe 19 results in rotating spring 30 out of valley 29a and toward a peak 29b. This of course increases the pressure between pipe 19 and the gripping element. Since the movement of pipe 19 in a direction corresponding to arrow 28 in FIG. 5 has transversely compressed spring 30 into solid engagement with core 31, any rotation of pipe 19 results in solid wedging engagement.

As shown above, the resilient element may be formed from a material having a circular cross-sectional shape. FIGS. 13 and 14 depict a case, however, where the resilient element is formed from a material having a substantially triangular shape, the corners being rounded. One of the edges 42 of the triangular shaped element 43 corresponding to an apex of the triangular cross-section abuts the solid core element 44 disposed therein, the side 45 opposite this apex being parallel with the surface of solid core element 44. This is the condition in the unflexed or relaxed state and is shown by FIG. 13. As gripping member 46 is brought into action such as in a pipe slip, side 45 of element 43 is tilted away from full surface engagement with member 46 and member 47 and element 43 is rolled into wedging relationship between solid core element 44 and gripped member 47 on one hand and element 44 and gripping element 46 on the other hand. This latter situation is seen in FIG. 14. Here again, element 44 prevents permanent distortion to resilient element 43. It is to be understood that any cross-sectional shape of the resilient element which will provide a rolling wedge action when the gripped and gripping member are moved relative to one another can be used and such shapes are not limited to triangular shapes but can include other angular shapes.

FIG. 12 shows the advantages of the force transmitting coupling when used to grip an uneven surface such as a pipe 35 having an undulating wall. Since the spring is an elastic body, it can conform to the undulating surface and therefore provide substantially uniform gripping whereas with prior art force transmitting couplings employing rigid toothed penetrators, elastic conformation to the gripped surface would be impossible.

Figure 8:
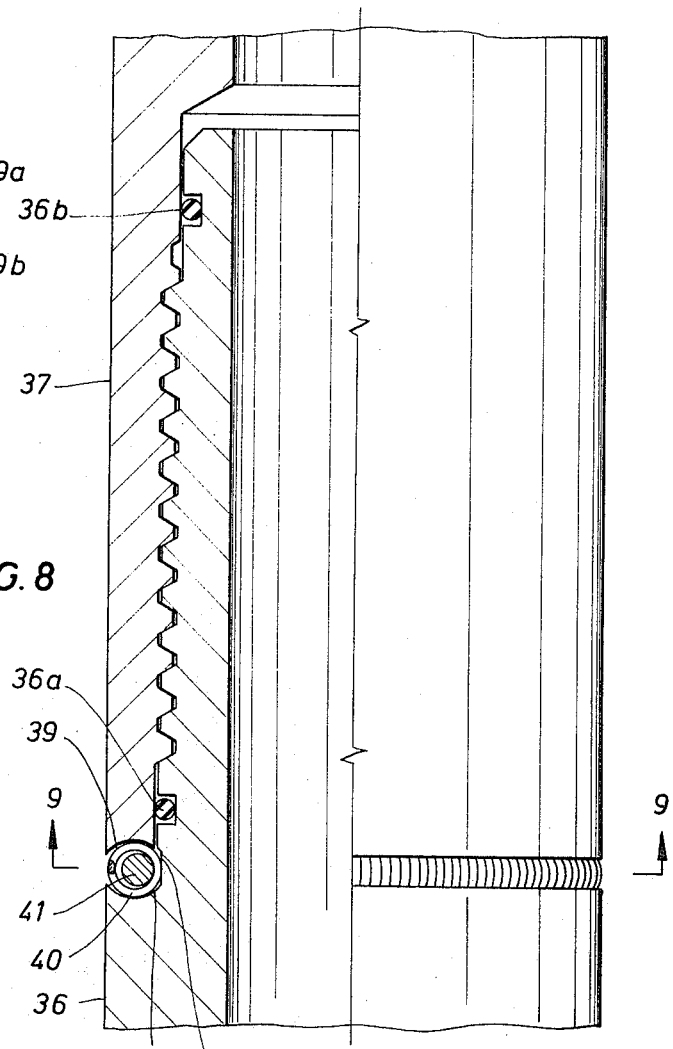
FIG. 8 is a view, partly in section, of the use of the device of the present invention in a safety coupling for a pipe string.
Figure 9:
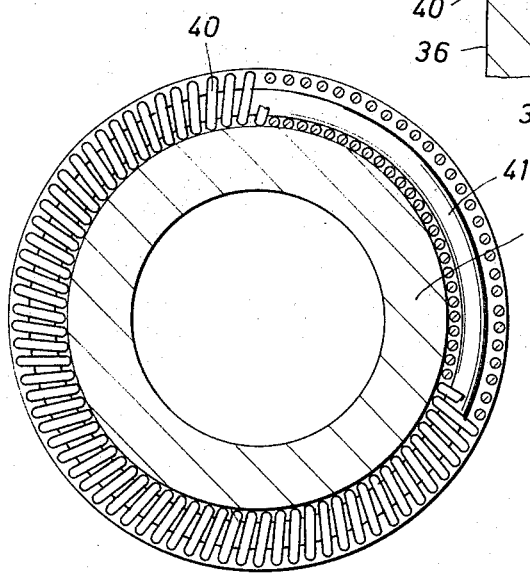
FIG. 9 is a cross-sectional view taken along the line 9—9 of FIG. 8.

FIGS. 8 and 9 depict another usage of the force transmitting coupling in a safety joint for a drill pipe string, it being understood that the concepts can be applied to other types of pipe. Threaded male end 36 and threaded female end 37 of two lengths of pipe, respectively, are concentrically joined together to form a pipe joint, O-rings 36a and 36b being used to effect a seal therebetween. Each of the threaded ends 36 and 37 has a circumferentially disposed raceway 38 and 39 respectively, which are in registering relationship to one another. Raceways 38 and 39 are generally of the same radius of transverse curvature extending from a common annular element axis therebetween. The safety joint comprised of the threaded sections and annular coil spring 40 having concentrically disposed therein an annular solid core element 41 is positioned in the annular space described by raceways 38 and 39. The radius of curvature of annular coil spring 40 is less than the radius of curvature of raceways 38 and 39 as determined by the common axis element running therebetween such that the relaxed convolutions of spring 40 do not conform to the shape of raceways 38 and 39. Thus, as either member 37 or 36 is rotated relative to the other one whereby the two members are urged together by means of the threads, spring 40 will frictionally engage the curved surfaces defining raceways 38 and 39 as the convolutions become transversely compressed into a more elliptical and less circular shape. As the convolutions of the spring 40 attempt to assume their relaxed state, i.e. their circular shape, they will urge the threads of members 36 and 37 together causing them to retain tight engagement over a range of relative axial movement of the two threaded sections. Thus it is seen that the action of the force transmitting coupling in this instance is to act as a lock between the two threaded members 36 and 37. In other words, when members 36 and 37 are in solid contact, i.e. the convolutions of spring 40 engage solid core 41, members 36 and 37 must be unscrewed beyond the point at which the convolutions are transversely compressed before the force of spring 40 urging them together is terminated. As in the previous cases, the presence of the annular solid core 41 prevents spring 40 from being distorted beyond its elastic limit and obtaining a permanent set when the two members are screwed together. While not necessary, it is preferred to have some means for providing that the coupling be retained on one of the members when they are disengaged. This can be conveniently accomplished by providing an annular groove 36c cut circumferentially into the surface of member 36 and constructing solid core element 41 from a material having enough elasticity such that when element 41 and spring 40 are slipped over the end of member 36, element 41 will tighten around member 36, urging spring 40 into groove 36c. Thus when the two members are separated, the coupling will be retained on member 36.

While the invention has been described with primary reference to the transmission of force between two relatively movable members, one of which is a pipe, rod, etc., the use of the force transmitting coupling is not so limited. The invention could be utilized in a unidirectional clutching system. In this case, an annular spring having disposed therein a solid core element would be circumferentially positioned between two relatively rotatable members having suitable registering raceways, the spring being stretched such that the convolutions are disposed in tiltably seated arrangement with the raceways of the two rotatable members. As in the cases described above, the force transmitting coupling when used as a clutch would again have the advantage that the resilient element of the clutch could not be distorted beyond its elastic limit because of the solid core element.

The coupling devices can also be used in numerous other force transmitting devices as for example in a so-called "fishing tool" to retrieve oil well tools from well bores. Numerous other uses of the force transmitting coupling will become apparent to those skilled in the art.

I claim:

1. In combination with two relatively movable members radially spaced from one another, a device for transmitting force between said members comprising a relilient element having convolutions positioned between said members, and a solid core element freely positioned within said convolutions said solid core element being completely free to rotate on an axis extending through said convolution, said solid core element and said resilient element being fee to move together, said resilient element being positioned such that sufficient relative movement of said members urges said convolutions into frictional engagement with both of said members and compressive engagement with said solid core element, said solid core element having a size such as to allow distortion of said convolutions of said resilient element within their elastic limit but prevent said convolutions from being distorted beyond their elastic limit thereby causing permanent set of said resilient element, said resilient element and said solid core element coacting as a unitary rolling element when said compressive engagement occurs.

2. The combination of claim 1 wherein said convolutions are substantially concentric.

3. The combination of claim 1 wherein said solid core element has substantially the same cross-sectional shape as said convolutions.

4. The combination of claim 1 wherein said resilient element comprises a coil spring.

5. The combination of claim 4 wherein there are a plurality of said devices between said members, the axes of said coil springs being substantially perpendicular to a plane passing transversely through the innermost and the outermost of said radially spaced members.

6. The combination of claim 5 wherein said convolutions are circular.

7. The combination of claim 6 wherein said devices are mounted on the outermost of said radially spaced members.

8. The combination of claim 7 wherein the surface of the outermost member facing said innermost member has a plurality of recesses circumferentially disposed therein, the depth of said recesses as measured from the outside surface of said innermost member varying thereby forming a shallower and a deeper portion of said recesses, said devices being movably mounted in said recesses, the diameter of said convolutions being greater than the distance between said shallower portion of said recesses and the outside surface of said innermost member such that said convolutions are transversely distorted when said coil spring is rolled in to said shallower portion of said recesses, the distance between the outside surface of the said innermost member and said deeper portion of said recesses being such that said convolutions are substantially undistorted when said coil springs are rolled into said deeper part of said recesses.

9. The combination of claim 8 wherein said recesses are arcuate shaped.

10. The combination of claim 9 wherein the innermost of said members comprises an elongate member having a circular cross-section.

* * * * *